United States Patent [19]

Erlandson

[11] Patent Number: 5,894,694
[45] Date of Patent: Apr. 20, 1999

[54] FISH AND CRUSTACEAN TRAP ESCAPE VENT SYSTEM

[76] Inventor: Donald G. Erlandson, 5 Meadow Rd., Topsham, Me. 04086

[21] Appl. No.: 08/871,879

[22] Filed: Jun. 6, 1997

[51] Int. Cl.⁶ ................................................ A01K 69/06
[52] U.S. Cl. .................... 43/100; 43/102; 43/103; 43/104
[58] Field of Search .................... 43/100, 102–105

[56] References Cited

U.S. PATENT DOCUMENTS

| | | |
|---|---|---|
| D. 259,434 | 6/1981 | Plante . |
| D. 259,435 | 6/1981 | Plante . |
| D. 367,695 | 3/1995 | Erlandson . |
| 2,769,274 | 11/1956 | Ougland ................ 43/105 |
| 3,426,472 | 2/1969 | Richard ................ 43/100 |
| 3,654,725 | 4/1972 | Kingston ............. 43/44.99 |
| 3,724,120 | 4/1973 | Richard ................ 43/100 |
| 3,842,529 | 10/1974 | Richard ................ 43/100 |
| 3,992,804 | 11/1976 | Senese ................. 43/100 |
| 4,159,591 | 7/1979 | Plante ................. 43/100 |
| 4,195,436 | 4/1980 | Moure ................. 43/100 |
| 4,206,562 | 6/1980 | Quevedo .............. 43/102 |
| 4,262,379 | 4/1981 | Jankiewicz ........... 43/100 |
| 4,445,295 | 5/1984 | Litrico ................. 43/102 |
| 4,648,199 | 3/1987 | Deaton . |
| 4,790,103 | 12/1988 | Tarantino ............. 43/102 |
| 5,259,809 | 11/1993 | Rainey, Jr. ........... 43/100 |
| 5,301,450 | 4/1994 | Boyd ................... 43/104 |
| 5,398,441 | 3/1995 | Melanson ............. 43/100 |

FOREIGN PATENT DOCUMENTS 1200031  7/1970  United Kingdom ............. 43/100

*Primary Examiner*—Michael J. Carone
*Assistant Examiner*—Darren Ark
*Attorney, Agent, or Firm*—Martin S. Chizek

[57] ABSTRACT

A Fish and Crustacean Trap Escape Vent System, consisting of an inexpensive conical-shaped escape vent with minimal water current noise or resistance, which presents a diminishing perspective to fish and crustaceans in the trap, secured to the trap with Coded, Corrosive-Release Fasteners of different diameters, thereby allowing for easy recognition by fishermen and enforcement authorities of which diameter of fastener is in use. Coding means includes offsets, crimps or color-coating imparted to different Fasteners. If the trap is lost or unrecovered for a predetermined time, the Coded Corrosive-Release Fasteners completely disintegrate and allow the Escape Vent to detach from the trap and allow any trapped fish and crustaceans to escape the trap. The unrecovered trap is now theoretically prevented from further fishing. The Escape Vent remains attached to the trap by conventional hog rings, and can be reused if and when the trap is recovered. Corrosive-Release Fasteners of different diameters and/or compositions can be tested in each locale. Regulations can then specify the wire diameter, composition, and method of coding the Corrosive-Release Fastener which is to be used in specific geographic areas.

20 Claims, 6 Drawing Sheets

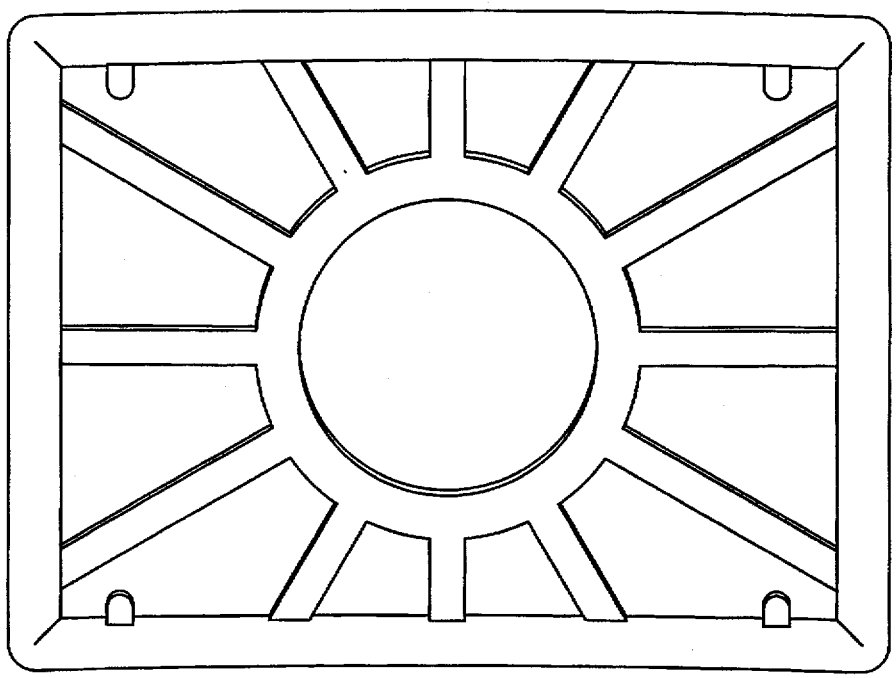 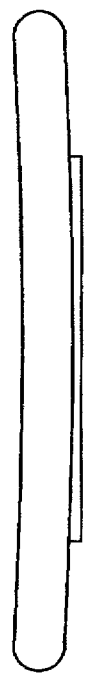
FIG. 2A                    FIG. 2B

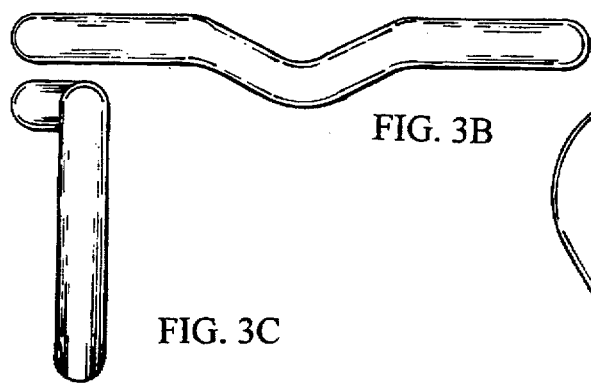
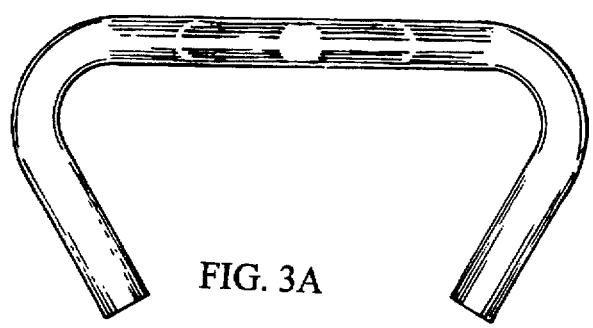
FIG. 3B
FIG. 3C
FIG. 3A
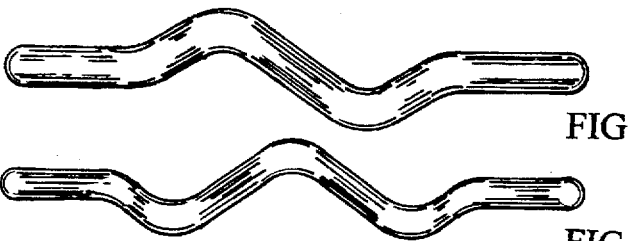
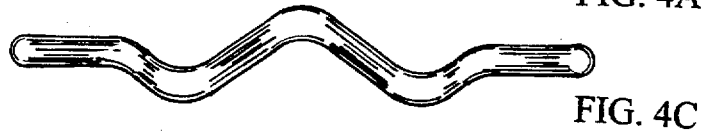
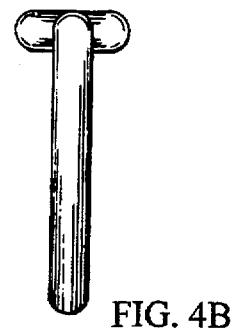
FIG. 4A
FIG. 4C
FIG. 4B

FIG. 6D
FIG. 6E
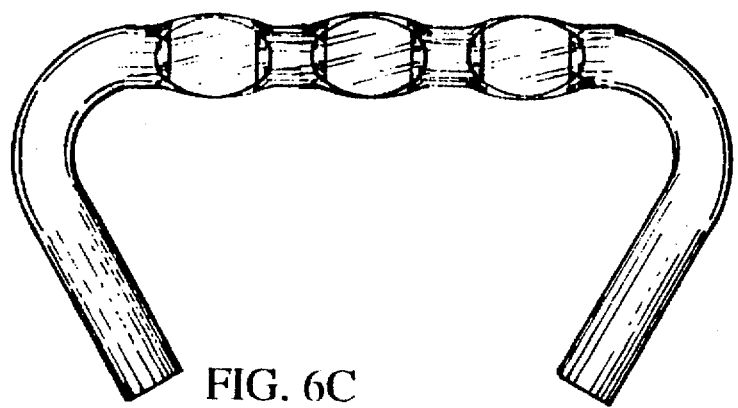
FIG. 6C

FISH AND CRUSTACEAN TRAP ESCAPE VENT SYSTEM

BACKGROUND OF THE INVENTION

The invention relates generally to a fish and crustacean trap escape vent secured to the trap by means of coded corrosive-release fasteners. More specifically, the invention is directed to a fish and crustacean trap escape vent which is attached to the trap by corrosive-release fasteners which are identifiable and selectable for different release times.

SETTING OF THE INVENTION

Current state and federal regulations govern the size of crab, fish and lobsters which may be caught, thereby protecting immature creatures from capture and preventing the excessive depletion of the crab, fish and lobster population. Thus, regulations require that certain fish and crustacean traps be provided with specifically proportioned rectangular, circular, or oblong panels or vents to allow the escape of creatures under the legal size. These escape vents serve the additional purpose of allowing small and unwanted creatures a means of escaping the trap, saving the fisherman time in sorting out the catch and discarding such undersized and unwanted creatures.

In addition to the requirement for escape vents, regulations have for several years required that each lobster trap have a "biodegradable" escape panel or vent which will disintegrate after an extended time period, and expose a specified-size escape opening. The requirement that the escape vent be biodegradable is to prevent the trap from fishing indefinitely in the event that the trap is lost or unrecovered for a long period of time. These lost and/or unrecovered traps are known as "ghost traps", and are responsible for the loss of large numbers of fish, crabs and lobsters every year. Some states are currently considering requiring biodegradable escape vents for crab traps as well as lobster traps.

Regulations typically specify that escape vents be constructed of untreated natural material such as cotton, hemp, sisal, or jute twine, or non-stainless uncoated ferrous metal not exceeding 3/32 inches in diameter, or of a soft wood lath. The regulations also generally allow escape panels to be constructed of any material if the panel is secured to the trap by one of the aforementioned materials. Finally, some regulations allow traps in which a gap is provided in the parlor section of the trap, between the trap frame and wall.

Fishermen have generally taken several approaches to comply with these regulations while minimizing the economic hardship of compliance. One approach is to cut an opening of approximate legal size into the trap mesh or laths. This is crude at best, may not meet the shape and dimensional requirements of the regulations, and do not meet the biodegradable requirement.

A more sophisticated approach taken by other fishermen is to attach conventional non-biodegradable escape vents to the trap with conventional 3/32 inch diameter iron hog rings which degrade over time due to the effects of electrolytic corrosion, and eventually disintegrate and separate, allowing the escape vent to fall away from the trap. The drawback to this approach is that the iron hog rings can take over a year to corrode and separate. Thus, an unrecovered "ghost trap" with an escape vent attached by conventional iron hog rings will continue to attract and trap fish and crustaceans which weaken and die, attracting still more creatures. Over the course of a year, this cycle can lead to significant and unnecessary depletion of the fish and crustacean population.

Prior art escape vents include U.S. Pat. No. 4,790,103 to Tarantino which discloses a shellfish trap with escape vent structures formed into the mesh of the trap sidewall, such structure to be drilled out by the user to a specific escape hole size. There also exists on the market a number of molded plastic escape vents which may be attached to existing traps. Examples of these include U.S. Pat. No. 367,695 to Erlandson, and U.S. Pat. Nos. 259,434 and 259,435 and 4,159,591 to Plante. These prior art escape vents suffer from too large a surface area, thus creating excessive "noise" in strong water currents which tends to scare away sea creatures. The large surface area also creates a "sail" effect which causes the trap to move and/or tilt from the water current. Additionally, regulations governing the specific sizes, number and position of escape vents vary widely from state to state, so that different types of traps must be made available to conform to each set of requirements.

Prior art addressing the requirements for biodegradable traps include U.S. Pat. No. 4,648,199 to Deaton which discloses a crustacean trap formed of molded panels, one such panel having an opening covered by a water-degradable material such as wood. U.S. Pat. No. 3,992,804 to Senese discloses a lobster trap with a buoyant top panel secured to the trap by means of a water soluble pin which allows the panel to float free after a predetermined time. Both of these inventions suffer from allowing the ghost trap to fish for extended periods, being inconsistent in their release times, and being excessively expensive and complicated.

The concept of using a more predictable release time of shorter duration could be inferred from other prior art utilizing galvanic corrosion as a timed-release mechanism in sea water. For example, U.S. Pat. No. 3,724,120 to Richard discloses a delayed release comprising an expendable anode linkage and cathode assembly which would release, for example, a concealed marker buoy to locate crustacean or fish traps. U.S. Pat. Nos. 3,654,725 to Kingston and 3,842,529 to Richard both disclose inventions which dispense fish bait after a predetermined time based upon galvanic corrosion. While either of these inventions could conceivably be adapted to release fish and lobster escape vents, the high cost of these devices would not be accepted among lobster and crab fishermen.

OBJECTIVES OF THE INVENTION

Accordingly, it is an object of the present invention to provide a simple, economical fish and crustacean escape vent with low water resistance and noise generation in strong water currents, which meets regulatory requirements for being biodegradable or corrodible, yet is reusable.

Another object is to provide an escape vent which, by its shape and design, present a diminishing perspective to fish and crustaceans, thus attracting said creatures to the vent when seeking escape from the trap.

Another object is to provide economical biodegradable fasteners for said escape vent which can be selected to provide varying and predictable release times which comply with applicable regulations regardless of local sea water conditions.

Yet another objective is to provide corrosive-release fasteners which are coded for easy identification by both fisherman and enforcement authorities, and can be easily selected and utilized to accommodate different environments and regulatory requirements.

These and still further objects are addressed hereinafter.

SUMMARY OF THE INVENTION

The foregoing objects are achieved, generally, in a Fish and Crustacean Escape Vent System that includes a webbed escape vent which presents low resistance to sea currents, attached to the side of a fish or crustacean trap by corrosive fasteners which can be selected and identified to provide varying release times.

BRIEF DESCRIPTION OF THE DRAWING

FIG. 2A is an enlarged view of the concave side of the escape vent.

FIG. 2B is an end view of the escape vent.

FIG. 3A is a front view of a single-offset coded Corrosive-Release Fastener.

FIG. 3B is a top view of a single-offset coded Corrosive-Release Fastener.

FIG. 3C is an end view of a single-offset coded Corrosive-Release Fastener.

FIG. 4A is a top view of a double-offset coded Corrosive-Release Fastener.

FIG. 4B is an end view of a double-offset or triple-offset coded Corrosive-Release Fastener.

FIG. 4C is a top view of a triple-offset coded Corrosive-Release Fastener.

FIG. 6C is a front view of a triple-crimp coded Corrosive-Release Fastener.

FIG. 6D is a top view of a triple-crimp coded Corrosive-Release Fastener.

FIG. 6E is an end view of a triple-crimp coded Corrosive-Release Fastener.

REFERENCE NUMERALS IN DRAWINGS

| 2 | Escape Vent | 3 | Side frame member |
|---|---|---|---|
| 4 | Trap lattice work | 5 | Ring member |
| 6 | Webbing members | 8 | Escape vent hole |
| 10 | Conventional stainless steel hog ring | 11 | End of Hog Ring |
| 12 | Upper frame member | 14 | Upper securing tab |
| 16 | Coded corrosive-release fastener | 18 | Lower frame member |
| 20 | Lower securing tab | 22 | Electrical insulator |

DETAILED DESCRIPTION OF THE INVENTION

Figure 1:
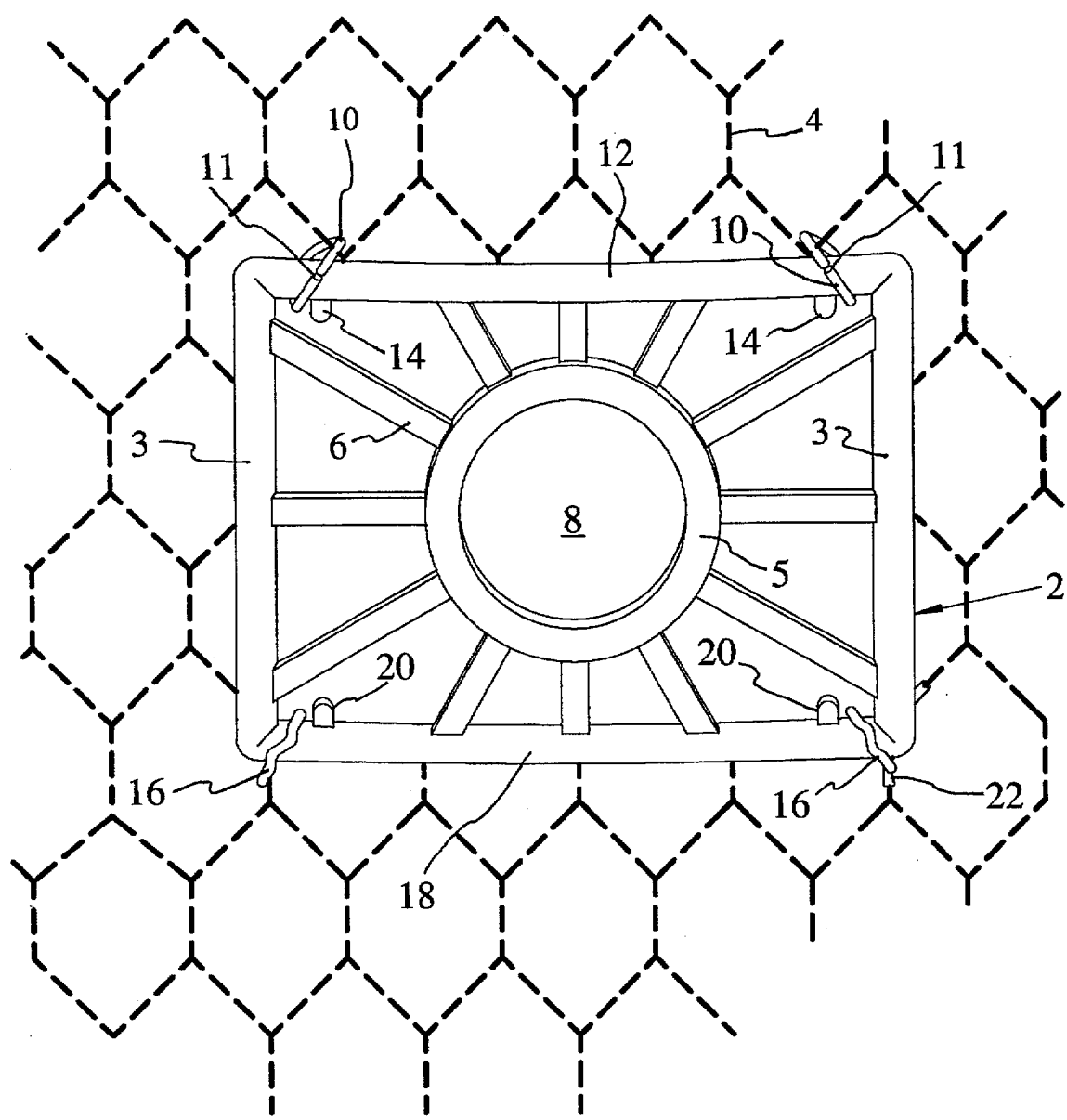
FIG. 1 shows the latticework of a typical crab, fish or lobster trap incorporating the escape vent system according to a preferred embodiment of the invention.

FIG. 1 illustrates a Fish and Crustacean Trap Escape Vent System installed in the lattice work of a conventional crab, fish or lobster trap according to a preferred embodiment of the invention. The Escape Vent 2 has an upper frame member 12, lower frame member 18, and two side frame members 3. Webbing members 6 are attached to the frame members, radiating out in a circular array, terminating in a ring member 5 which defines an escape hole 8. To install the Escape Vent in a conventional lattice work trap, the Escape Vent 2 is first positioned over the trap lattice work 4 with its long dimension preferably oriented horizontally, i.e., parallel to the bottom of the trap. The concave side of the escape vent, as illustrated in front view FIG. 2A and top view FIG. 2B, must be positioned such that it faces into the trap. This slight conical shape, in combination with the circular-array pattern of the webbing members 6, presents a diminishing perspective to fish and crustaceans similar to the perspective provided by the funnel or cone shaped openings of decreasing cross-section through which the creatures are initially enticed into the traps. Thus, this diminishing perspective promotes the escape of undersized creatures through the escape vent hole 8. An additional advantage of this design is that the webbing members 6 have a small surface area, and thus do not create excessive water current "noise" or result in a "sail" effect which would cause the trap to move and/or tilt from the sea current.

Turning again to FIG. 1, a conventional stainless steel hog ring 10 is then looped through the trap lattice work 4 and fastened around the upper frame member 12 of the Escape Vent, between the webbing member 6 and one of the upper securing tabs 14. Since conventional hog rings are generally manufactured with their ends offset from each other, care must be taken to ensure that the hog ring 10 is fastened such that the ends 11 of the hog ring butt against each other, rather than bypassing each other. This ensures that the inner perimeter of the hog ring maintains an opening within which the cylindrical upper frame member 12 can rotate. If the hog ring 10 is crimped too tightly, or is crimped with the ends 11 overlapping, the Escape Vent may be restrained from rotating. As an alternative, a "butt ring" may be utilized which is merely a conventional hog ring manufactured flat so that the ends do not bypass each other when crimped.

A second conventional stainless steel hog ring 10 may then be attached in the same manner to the opposite corner of the Escape Vent upper frame member 12, between the webbing member 6 and the remaining upper securing tab 14. The securing tabs function to prevent excessive lateral movement of the upper frame member 12 while still allowing for the Escape Vent to be installed on traps with varying separation distances between the trap lattice work.

After the upper frame member 12 has been secured by the conventional hog rings 10, an opening of a size equal to, or just smaller than, the Escape Vent length and width is then cut into the trap lattice work 4. A Coded Corrosive-Release Fastener 16 is then looped through the trap lattice work 4 and crimped or wrapped around the lower frame member 18 of the Escape Vent, just outside one of the lower securing tabs 20. The Coded Corrosive-Release Fastener 16 may then be crimped down or wrapped tightly, since no hinge action about the lower frame member 18 of the Escape Vent is necessary. A second Coded Corrosive-Release Fastener 16 is then attached in the same manner between the webbing member 6 and the remaining lower securing tab 20.

When the Coded Corrosive-Release Fasteners 16 completely disintegrate, the lower frame member 18 of the Escape Vent 2 is no longer secured to the trap lattice work 4. The positive buoyance of the Escape Vent will then cause the bottom of the Escape Vent to tend to float towards the surface. This force will, in turn, cause the cylindrical upper frame member 12 to pivot within the openings defined by the crimped conventional stainless steel hog rings 10, thereby exposing the opening previously cut into the trap lattice work and allowing any trapped fish and crustaceans to escape the trap. The trap is now theoretically prevented from further fishing. The Escape Vent remains attached to the trap by the conventional hog rings 10, and can be reused if and when the trap is recovered.

Some home-made and conventional factory-made fish and crustacean traps may be constructed of galvanized chicken wire or even refrigerator shelves, which will degrade from electrolytic corrosion after several months. To extend the life of these traps, some fishermen attach a zinc sacrificial anode (not shown) to the trap. In a well-known process, this sacrificial anode undergo accelerated corrosion while serving to retard the corrosion of the trap. In order to isolate the Corrosive-Release Fastener from the effects of such a sacrificial anode, a common electrical insulator 22, or electrical tape, may be inserted between the Fastener and the metal lattice work of a trap which utilizes a sacrificial anode.

While the above discussion has described the installation and functioning of a system which utilizes an escape vent with positive buoyancy, the disclosed Fish and Crustacean Trap Escape Vent System can be easily adapted for usage with a negatively buoyant escape vent. In this case, the Coded Corrosive-Release Fasteners 16 would be crimped around the upper frame member 12 of the Escape Vent 2, and the conventional stainless steel hog rings 10 would be secured around the lower frame member 18 of the Escape Vent. When the Coded Corrosive-Release Fasteners 16 disintegrate, the Escape Vent will tend to sink. As described above, the hog rings 10 must be fastened around the lower frame member 18 loosely such that the cylindrical lower frame member may rotate within the hog rings.

The Escape Vent 2 may also be installed in the fish or crustacean trap lattice work 4 with its concave surface toward the trap, but its long dimension aligned vertically, i.e., perpendicular to the bottom of the trap. The method of attachment to the trap, and the functioning of the corrosive and non-corrosive fasteners remains the same as described above, with the exception that fasteners are now attached to the side frame members 3. Additionally, the Escape Vent may also be installed on the top of the trap as well as the side of the trap.

The coding means to easily identify the Coded Corrosive-Release Fasteners may take several forms.

Figure 5A:
FIG. 5A is a top view of a four-offset coded Corrosive-Release Fastener with the offsets imparted near the center of the Fastener.
Figure 5D:
FIG. 5D is a top view of a five-offset coded Corrosive-Release Fastener with the offsets imparted near the center of the Fastener.
Figure 5B:
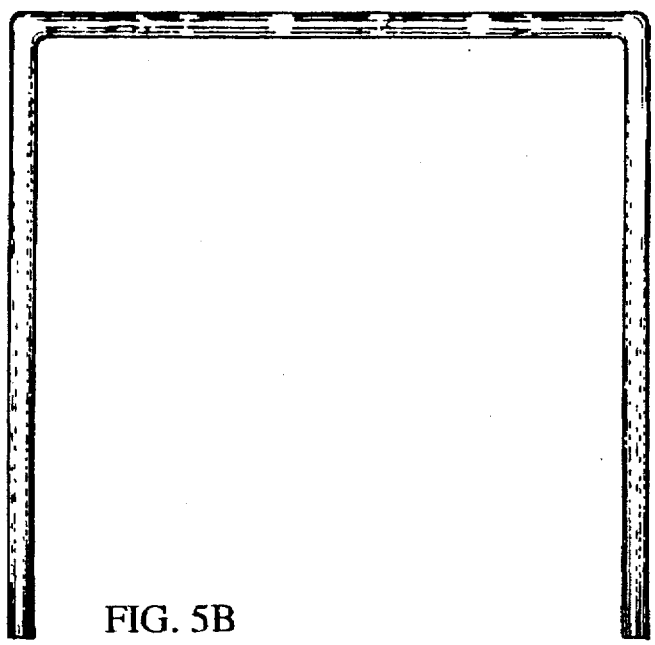
FIG. 5B is a front view of a four-offset coded Corrosive-Release Fastener with the offsets imparted near the center of the Fastener.
Figure 5C:
FIG. 5C is an end view of a four-offset or five-offset coded Corrosive-Release Fastener with the offsets imparted near the center of the Fastener.

FIGS. 3A through 3C show the front, top, and end view, respectively, of a serpentine style single-offset coded Corrosive-Release Fastener. In the preferred embodiment, the Coded Corrosive-Release Fastener takes the form of wires or hog rings manufactured from different wire diameters. For example, a single-offset code would preferably identify 14 gauge (0.080 inch diameter) wire as illustrated in front view FIG. 3A and top view FIG. 3B. A double-offset code would preferably identify 16 gauge (0.0625 inch diameter) wire as illustrated in top view FIG. 4A and end view FIG. 4B. A triple-offset code would preferably serve as the code to identify 18 gauge (0.0475 inch diameter) wire as illustrated in top view FIG. 4C and end view FIG. 4B. Four offsets would preferably serve as the code to identify 20 gauge (0.0348 inch diameter) wire as illustrated in top view FIG. 5A, front view FIG. 5B and end view FIG. 5C. Five offsets would preferably serve as the code to identify 22 gauge (0.0286 inch diameter) wire as illustrated in top view FIG. 5D and end view FIG. 5C. Each differently-sized (and coded) wire will corrode and disintegrate after a different predetermined time period, with the largest diameter (single-offset coded) Corrosive-Release Fastener taking the longest, and the smallest diameter (five-offset coded) Corrosive-Release Fastener taking the shortest time to disintegrate and separate.

14 gauge (0.080 inch diameter), 16 gauge (0.0625 inch diameter), and 18 gauge (0.0475 inch diameter) Coded Corrosive-Release Fasteners will be preferably manufactured in ring form, as illustrated in FIGS. 3A through 4C. Due to their thickness, the preferred method of securing an Escape Vent with these ring-style Coded Corrosive-Release Fasteners is with crimping pliers, with the portion of the Fastener having the identifying coding turned towards the outside of the trap to facilitate easy visual verification by enforcement authorities.

Figure 5F:
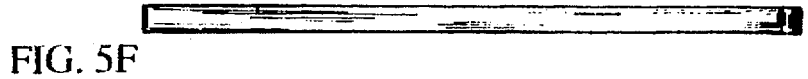
FIG. 5F is a top view of a four-offset coded Corrosive-Release Fastener with the offsets imparted near one end of the Fastener.
Figure 5E:
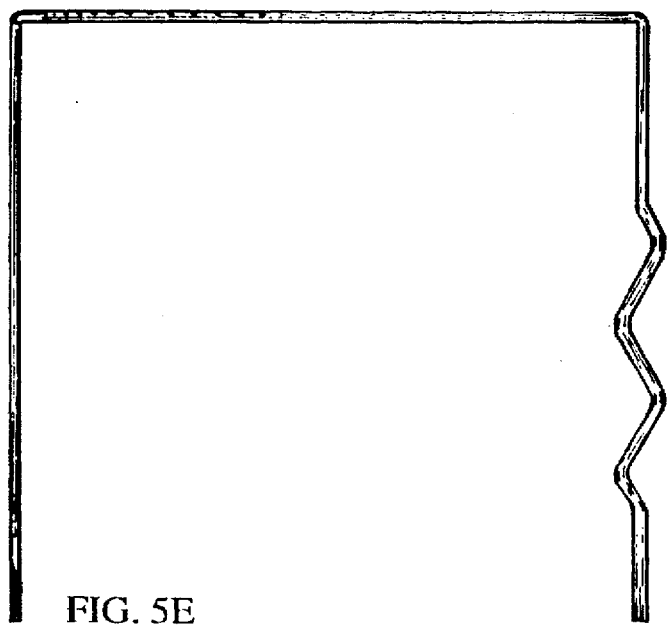
FIG. 5E is a front view of a four-offset coded Corrosive-Release Fastener with the offsets imparted near one end of the Fastener.
Figure 5G:
FIG. 5G is an end view of a four-offset coded Corrosive-Release Fastener with the offsets imparted near one end of the Fastener.

20 gauge (0.0348 inch diameter) and 22 gauge (0.0286 inch diameter) Coded Corrosive-Release Fasteners would preferably be produced in a wire form, with the coding offsets located in the center of the wire as illustrated in FIGS. 5A through 5D. Alternatively, the coding offsets could be located near one end of the wire, such as the four-offset coded wire shown in front, top and end view of FIGS. 5E through 5G, respectively. The preferred method of securing an escape vent with these wire-style Coded Corrosive-Release Fasteners is to wrap the Fastener around the escape vent lower frame member 18 and the trap lattice work 4, and twist the ends together with pliers or bare hands. That portion of the Fastener having the identifying coding should be left hanging away from the trap to facilitate easy visual verification by enforcement authorities.

Figure 6B:
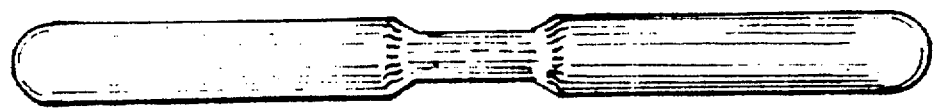
FIG. 6B is a top view of a single-crimp coded Corrosive-Release Fastener.
Figure 6A:
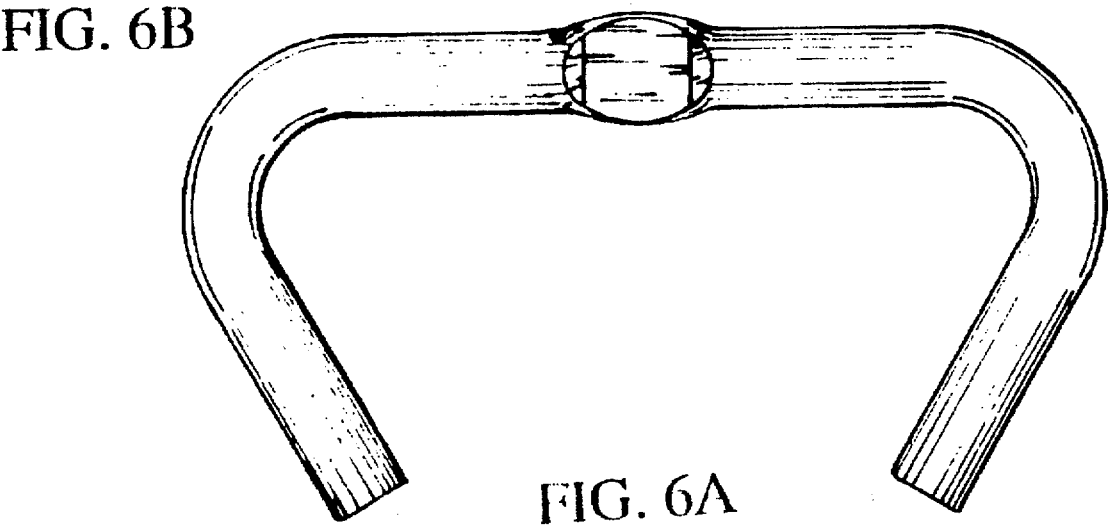
FIG. 6A is a front view of a single-crimp coded Corrosive-Release Fastener.

Another method of coding and identifying the Corrosive-Release Fasteners is by crimping, thereby distinguishing different wire diameters in a manner similar to the "offset-coding" described above. FIGS. 6A and 6B illustrate the front and top view, respectively, of an example of a Corrosive-Release Fastener coded by means of one crimp, thus preferably designating a 14 gauge (0.080 inch diameter) wire. FIGS. 6C through 6E illustrate the front, top, and end view, respectively, of an example of a Corrosive-Release Fastener coded by means of a triple-crimp, thus preferably designating an 18 gauge (0.0475 inch diameter) wire.

Figure 7B:
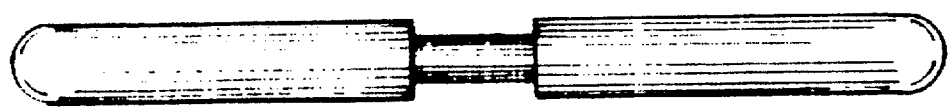
FIG. 7B is a top view of a color-coded Corrosive-Release Fastener.
Figure 7A:
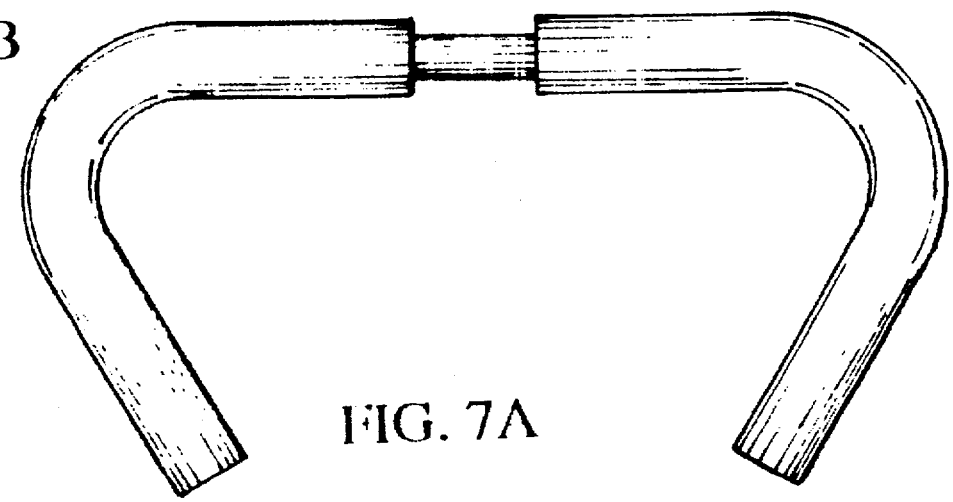
FIG. 7A is a front view of a color-coded Corrosive-Release Fastener, whereby the coding means comprises the color of the coating applied to the Fastener.

Yet another coding method for a Corrosive-Release Fastener is by applying a colored layer or coat of material such as plastic or polyvinyl chloride on the Fastener. The method of identification could then be the different colors of the coating. It is important to note, however, that a small section of the coating must be removed from the Corrosive-Release Fastener so as to expose it to water, and thus allow the galvanic corrosion of the Fastener to take place. FIGS. 7A and 7B illustrate the front and top view, respectively, of an example of a color coded Corrosive-Release Fastener with a section of the coating removed, thus preferably designating a 14 gauge (0.080 inch diameter) wire.

The Escape Vent may be constructed from conventional plastic material, and may be produced using conventional stamping or injection molding techniques. 13 gauge conventional iron hog rings and stainless steel hog rings are readily available from most fishing supply stores. Other sizes and hog rings and wire may be obtained from wire manufacturers. In addition to iron, the composition of the Coded Corrosive-Release Fasteners may be zinc or zinc-aluminum. The Fasteners may be offset-coded by mechanical presses or other conventional means. The Fasteners may be crimp-coded by means of mechanical presses, crimping pliers or other conventional means.

The invention here is an improved Fish and Crustacean Trap Escape Vent System, consisting of an inexpensive conical-shaped escape vent with minimal sea current resistance which presents a diminishing perspective to fish and crustaceans in the trap, secured to the trap with coded, corrodible wire fasteners of different diameters, thereby allowing for easy recognition by fishermen and enforcement authorities of which diameter of fastener is in use. Regardless of which manner of coding is used, the identifying coding features should be positioned such that they can be easily visually verified. Since the rate of galvanic corrosion is based upon seawater condition such as water temperature, salinity, oxygen content and current rate, Corrosive-Release Fasteners of different diameters and/or compositions will have to be tested in each locale. Regulations can then specify the wire diameter, composition, and method of coding the Corrosive-Release Fastener which is to be used in specific geographic areas.

What is claimed is:

1. In a sea-water or fresh-water fish or crustacean trap having a lattice work side or top structure, an escape vent system comprising:

(a) an escape vent of molded plastic material to replace a top or side portion of the fish or crustacean trap lattice work, said escape vent having substantially cylindrical and parallel upper and lower frame members with at least one securing tab disposed upon said upper and lower frame members, two substantially parallel side frame members, a plurality of webbing members extending from, and situated between, said frame members and at least one ring located substantially in the center of said escape vent for selectively defining a fish or crustacean escape hole;

(b) securing means for pivotably attaching said escape vent to the side or top of said fish or crustacean trap, said securing means comprising at least one non-corrosive fastener;

(c) additional securing means for detachably attaching said escape vent to the side or top of said fish or crustacean trap, said additional securing means comprising at least one corrosive-release fastener of predetermined diameter; and (d) identifying means for coding said predetermined diameter of said corrosive-release fastener, said identifying means for coding identifying the at least one corrosive-release fastener and its corresponding predetermined fastener release time from different corrosive-release fasteners, whereby said escape vent remains fully attachable to said trap and functions to allow undersized trapped fish and crustaceans to escape through said escape hole during normal usage, and whereby said at least one corrosive-release fastener will disintegrate after said predetermined release time and allow said escape vent to pivot away from said side or top of said trap, allowing all fish and crustaceans to escape when said trap remains unrecovered after said predetermined release time.

2. The escape vent system of claim 1, wherein said upper, lower, and side frame members have a slight concave curvature with respect to said trap when attached, and each said webbing member has a first and second end, said first end attached to the inside perimeter defined by said upper, lower, and side frame members, and said second end disposed toward the center of said escape vent and attached to the outer perimeter of said at least one ring, such that the webbing members and escape hole present a diminishing perspective to undersized trapped fish and crustaceans, thereby encouraging their escape from said trap.

3. The escape vent system of claim 1, wherein said at least one non-corrosive fastener comprises a stainless steel hog ring loopable through the lattice work of said trap and fastenable around said escape vent upper frame member between said at least one securing tab and the adjacent frame side member, so that ends of the hog ring butt against each other when crimped to define a space of sufficient inside diameter to allow said escape vent upper frame member to rotate freely within said crimped hog ring inside diameter.

4. The escape vent system of claim 1, wherein said at least one corrosive-release fastener comprises a metal or metal-alloy wire which undergoes electrolytic corrosion upon exposure to water and disintegrates after a predetermined time span, said predetermined time span determined by the diameter of said metal or metal-alloy wire and surrounding water conditions.

5. The escape vent system of claim 4, wherein a composition of said metal or metal-alloy wire is selected from the group consisting of iron, zinc, and zinc/aluminum.

6. The escape vent system of claim 5, wherein the at least one corrosive-release fastener predetermined diameter varies from 0.0286 inch to 0.08 inch, whereby each different corrosive-release fastener predetermined diameter will corrode and ultimately release after a different but determinable time span.

7. The escape vent system of claim 1, wherein said escape vent plastic of molded material is positively buoyant with respect to the surrounding water, said non-corrosive fastener comprises a stainless steel hog ring loopable through the trap lattice work and fastenable around said escape vent upper frame member so that ends of the hog ring butt against each other when crimped to define a space of sufficient inside diameter to allow said escape vent upper frame member to rotate freely within said crimped hog ring inside diameter, and said at least one corrosive-release fastener is attachable to said escape vent lower frame member and to the trap lattice work such that when said corrosive-release fastener disintegrates after an extended predetermined time, the partially unsecured escape vent will tend to rise and cause said upper frame member to pivot within said non-corrosive fastener, thereby allowing escape of all fish and crustaceans within said trap.

8. The escape vent system of claim 1, wherein said escape vent of molded plastic material is negatively buoyant with respect to the surrounding sea water, said at least one non-corrosive fastener comprises a stainless steel hog ring loopable through the trap lattice work and fastenable around said escape vent lower frame member so that ends of the hog ring butt against each other when crimped to define a space of sufficient inside diameter to allow said escape vent lower frame member to rotate freely within said crimped hog ring inside diameter, and said corrosive-release fastener is attachable to said escape vent upper frame member and to the trap lattice work such that when said corrosive-release fastener disintegrates after an extended predetermined time, the partially unsecured escape vent will tend to sink and cause said lower frame member to pivot within said non-corrosive fastener, thereby allowing escape of all fish and crustaceans within said trap.

9. The escape vent system of claim 1, wherein the identifying means for coding the at least one corrosive-release fastener includes one or more serpentine offsets imparted to said at least one corrosive-release fastener, the number of serpentine offsets corresponding to and identifying a selectively defined corrosive-release fastener wire diameter and corresponding corrosion time.

10. The escape vent system of claim 1, whereby the identifying means for coding the at least one corrosive-release fastener includes one or more crimps imparted to said at least one corrosive-release fastener, the number of crimps corresponding to and identifying a selectively defined corrosive-release fastener wire diameter and corresponding corrosion time.

11. The escape vent system of claim 1, whereby the identifying means for coding the at least one corrosive-release fastener includes one or more crimps imparted to said at least one corrosive-release fastener, the number of crimps corresponding to and identifying a selectively defined corrosion time, at least one crimp thickness being less than the at lease one corrosive-release fastener predetermined diameter such that said at least one corrosive-release fastener's corrosion time is determined by said at least one crimp thickness rather than said at least one corrosive-release fastener predetermined diameter.

12. The escape vent system of claim 1, wherein the identifying means for coding the at least one corrosive-release fastener includes a layer of colored material applied to a substantial part, but not the entire surface area, of said at least one corrosive-release fastener, whereby the color of the material corresponds to and identifies a selectively defined corrosive-release fastener wire diameter and corresponding corrosion time.

13. The escape vent system of claim 12, wherein the material of said layer of colored material is selected from the group consisting of plastic and polyvinyl chloride.

14. In a fish or crustacean trap having a lattice work side or top structure, an escape vent system comprising:

(a) an escape vent of molded plastic material to replace a top or side portion of the fish or crustacean trap, said escape vent further comprising substantially parallel upper and lower frame members with at least one securing tab disposed upon said upper frame member and lower frame member, two substantially parallel side frame members, and a plurality of webbing members extending from said upper, lower, and side frame members and defining a fish or crustacean escape hole;

(b) securing means for pivotably attaching said escape vent to the top or side of said fish or crustacean trap, wherein said securing means comprises a plurality of non-corrosive fasteners;

(c) additional securing means for detachably attaching said escape vent to the top or side of said fish or crustacean trap, wherein said additional securing means comprises a plurality of corrosive-release fasteners of predetermined diameter;

(d) an electrically non-conducting insulator surrounding and isolating each of said plurality of corrosive-release fasteners from the fish or crustacean trap when a sacrificial anode to retard electrolytic corrosion is utilized by the fish or crustacean trap; and (e) identifying means for coding said corrosive-release fasteners, wherein said identifying means comprises at least one crimp or offset or color-coating code imparted to said corrosive-release fasteners whereby said at least one crimp or offset or color-coating code corresponds to a corrosive-release fastener of predetermined diameter and corrosion time, whereby said escape vent remains fully attachable to said trap and functions to allow undersized trapped fish and crustaceans to escape through said escape hole during normal usage, and whereby said insulator allows each of said corrosive-release fasteners to corrode without retarding effect from the sacrificial anode, whereby each of said plurality of corrosive-release fasteners disintegrates after said predetermined corrosion time and allows said escape vent to pivot away from said side or top of said trap, allowing all fish and crustaceans to escape when said trap is unrecovered after an extended period of time, and whereby said identifying means allows for easy verification of said predetermined corrosive-release fastener diameter by enforcement officials.

15. The escape vent system of claim 14, wherein the identifying means for coding each of the corrosive-release fasteners comprises a single-crimp or single-offset or red-coating code imparted to said each of the corrosive-release fasteners, thereby identifying a 14 gauge and 0.080 inch diameter corrosive-release fastener and corresponding release time.

16. The escape vent system of claim 14, wherein the identifying means for coding each of the corrosive-release fasteners comprises a double-crimp or double-offset or yellow-coating code imparted to said each of the corrosive-release fasteners, thereby identifying a 16 gauge and 0.0625 inch diameter corrosive-release fastener and corresponding release time.

17. The escape vent system of claim 14, wherein the identifying means for coding each of the corrosive-release fasteners comprises a triple-crimp or triple-offset or blue-coating code imparted to said each of the corrosive-release fasteners, thereby identifying an 18 gauge and 0.0475 inch diameter corrosive-release fastener and corresponding release time.

18. The escape vent system of claim 14, wherein the identifying means for coding each of the corrosive-release fasteners comprises a four-crimp or four-offset or white-coating code imparted to said each of the corrosive-release fasteners, thereby identifying a 20 gauge and 0.0348 inch diameter corrosive-release fastener and corresponding release time.

19. The escape vent system of claim 14, wherein the identifying means for coding each of the corrosive-release fasteners comprises a five-crimp or five-offset or green-coating code imparted to said each of the corrosive-release fasteners, thereby identifying a 22 gauge and 0.0286 inch diameter corrosive-release fastener and corresponding release time.

20. A method for fishermen to attach a positively buoyant escape vent to a fish and crustacean trap using coded corrosive-release fasteners of different diameters and corresponding corrosion rates, comprising:

(a) applying one or more crimps or offsets or a color-coat to a corrosive-release fastener of predetermined diameter, whereby said one or more crimps or offsets serves as a code to identify a different and specific diameter of said fastener;

(b) subjecting a plurality of said coded corrosive-release fasteners of differing diameters to exposure in sea water in various locales until said corrosive-release fasteners corrode and disintegrate;

(c) recording the disintegration times of said plurality of coded corrosive-release fasteners of differing diameters;

(d) selecting said coded corrosive-release fastener corresponding to the closest disintegration time specified by the regulations of each specific locale;

(e) specifying the selected coded corrosive-release fastener for usage by fishermen setting fish and crustacean traps in that locale;

(f) installing an escape vent onto each of said fish or crustacean traps using at least one said specified coded corrosive-release fastener; and (g) informing local enforcement authorities of the corrosive-release fastener coding specified for their area, whereby said authorities can periodically retrieve the traps and quickly verify whether said fish and crustacean trap escape vents are equipped with specified corrosive-release fasteners of the specified code and corresponding release time, and whereby said fasteners will corrode and disintegrate after a predetermined period of time and allow said escape vents to detach from said traps and release any creatures therein.

* * * * *